(12) United States Patent
Goldman et al.

(10) Patent No.: US 6,321,229 B1
(45) Date of Patent: *Nov. 20, 2001

(54) METHOD AND APPARATUS FOR USING AN INFORMATION MODEL TO ORGANIZE AN INFORMATION REPOSITORY INTO A HIERARCHY OF INFORMATION

(75) Inventors: Jason David Goldman; Brian John O'Keefe, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/258,576

(22) Filed: Feb. 26, 1999

(51) Int. Cl.[7] .................................................. G06F 17/30
(52) U.S. Cl. .............................. 707/100; 707/103; 707/1
(58) Field of Search ..................................... 707/100, 102, 707/103, 1

(56) References Cited

U.S. PATENT DOCUMENTS

| | | | |
|---|---|---|---|
| 5,815,703 | * | 9/1998 | Copeland et al. .................... 707/102 |
| 6,023,703 | * | 2/2000 | Hill ...................................... 707/100 |
| 6,098,072 | * | 8/2000 | Sluiman et al. ..................... 707/103 |

\* cited by examiner

*Primary Examiner*—Jean R. Homere
*Assistant Examiner*—Greta L. Robinson

(57) ABSTRACT

The invention described herein is an apparatus for accessing an information repository, including computer readable program code stored on computer readable media, where the computer readable program code includes code for organizing information stored in the information repository into a hierarchy. The hierarchy is a hierarchy of a number of derived containers that are generated in conformance with an information model which is a hierarchy of container definition nodes. Each of the derived containers corresponds to a different one of the container definition nodes, represents a category of information in the information repository, and has contents which can be other derived containers and/or information extracted from the information repository.

20 Claims, 17 Drawing Sheets

| field: JobNo | field: Job | field: Skills | field: Grade | field: Tech/Prof | field: IsAvailable |
|---|---|---|---|---|---|
| 700 | REPAIRER | COMP | --- | TRUE | TRUE |
| 701 | SECRETARY | OFFICE | --- | FALSE | TRUE |
| 702 | SECRETARY | OFFICE | --- | FALSE | FALSE |
| 703 | PLUMBER | TRADE | --- | FALSE | TRUE |
| 704 | PROGRAMMER | COMP | --- | TRUE | FALSE |
| 705 | PROGRAMMER | COMP | --- | TRUE | FALSE |
| 706 | PROGRAMMER | COMP | --- | TRUE | TRUE |
| 707 | ELECTRICIAN | TRADE | --- | FALSE | TRUE |
| 708 | SECRETARY | OFFICE | --- | FALSE | FALSE |
| 709 | SECRETARY | OFFICE | --- | FALSE | TRUE |
| 710 | PLUMBER | TRADE | 2 | FALSE | TRUE |
| 711 | REPAIRER | ELEC | --- | TRUE | TRUE |
| 712 | PLUMBER | TRADE | 1 | FALSE | TRUE |

FIG. 7

```
AVAILABLE        802
    TECH/PROF        804
        COMPUTERS        806
            REPAIRER         808
            PROGRAMMER       810
        ELECTRONICS      812
    OFFICE               814
        SECRETARY        816
    TRADE                818
        PLUMBER          820
            GRADE I          822
            GRADE II         824
```
⎫
⎬ 800
⎭

*FIG. 8A*

```
TECH/PROF        828
    COMPUTERS        830
        REPAIRER         832
        PROGRAMMER       834
    ELECTRONICS      836
```
⎫
⎬ 826
⎭

*FIG. 8B*

```
OFFICE
    SECRETARY
```

*FIG. 8C*

```
TRADE
    PLUMBER
        GRADE I
        GRADE II
```

*FIG. 8D*

METHOD AND APPARATUS FOR USING AN INFORMATION MODEL TO ORGANIZE AN INFORMATION REPOSITORY INTO A HIERARCHY OF INFORMATION

FIELD OF THE INVENTION

This invention pertains to the field of computer implemented organizational systems, and more particularly to a method and apparatus for using an information model to organize an information repository into a hierarchy of information.

BACKGROUND OF THE INVENTION

This application is related to the copending U.S. Application of Jason Goldman and Brian O'Keefe entitled "METHOD AND APPARATUS FOR USING AN INFORMATION MODEL TO ORGANIZE AN INFORMATION REPOSITORY INTO AN EXTENSIBLE HIERARCHY OF INFORMATION" the copending U.S. Application of Jason Goldman and D. Jon Lachelt entitled "METHOD AND APPARATUS FOR USING AN INFORMATION MODEL TO ORGANIZE AN INFORMATION REPOSITORY INTO AN EXTENSIBLE HIERARCHY OF ORGANIZATIONAL INFORMATION" and the copending U.S. Application of Jason Goldman entitled "METHOD AND APPARATUS FOR USING AN INFORMATION MODEL TO CREATE A LOCATION TREE IN A HIERARCHY OF INFORMATION" and incorporates by reference all that is disclosed therein.

Generally, information repositories hold a wealth and variety of information that can be accessed. Examples of information repositories include program files comprising a list of subroutines and/or variables used in the program, and databases comprising records. Information repositories can also be in non-automated form, such as library index cards comprising information like call numbers, publishers, and authors. In a small information repository, information can be relatively easy to decipher and organize. As is often the case, however, any useful information repository will contain and accumulate an infinite amount of information so that organizing the information in any useful manner becomes a difficult task. This problem can be demonstrated in an information repository such as a database.

Databases are a large and powerful resource of information in a society automated by computers and computer processes. A database is a repository of files containing records, where each record contains fields that are attributes of the record, and every record in the same file comprises the same fields. For example, records in a job database can comprise fields such as Position, Level, Company, Salary, Years of Experience, and Skills, each of which is an attribute of a job in the job database. In a more general sense, a database is also a collection of files containing records that are subject to the same set of operations for searching, sorting, recombining, and other functions.

Information in a database can be accessed by a custom program written for a particular application. For example, a program in a job placement application might display a list of all available jobs from a job database. This method of access to database information is limited, however, because it requires that such a program be customized for a particular use, language, and/or database, amongst other factors, which can involve a great deal of expertise, time, and expense. While this is oftentimes necessary, particularly where a database is highly integrated into an application and a user needs sophisticated functionality such as the ability to add, change, and delete database records, it can be overkill for a user who needs minimal access, such as when the user only needs to view database records.

For minimal use, a database can also be accessed by "querying" the database, which at the very least does not require the expertise, time, and expense of a custom program. A query is a specific set of instructions for the purpose of extracting data from a database based on one or more selection criterion. For example, if a user wants to see all jobs in a job database that pay more than $20,000, a query might read "(Salary>=$20,000)". The query, which is written in commands comprehensible by the particular database being queried (eg., SQL), instructs a program to search the database for any and all records that satisfy the one or more selection criterion of the query. In the previous example, therefore, a program reads the Salary field of each record to determine if the value in that field is greater than or equal to $20,000. If the test fails, the program proceeds to test the next record. If the test passes, the program will extract that record from the database for processing, such as viewing or displaying. The result is a cost effective method of extracting information from a database tailored to a user's specific needs.

While creating queries is cost effective, it is not always efficient. Oftentimes, a user needs access to a specific set of records that requires a more complex query, such as when a user wants to see all of the available professional jobs that do not require computer programming skills. A query to obtain this information from a database might read "((isAvailable=TRUE) AND (Tech/Prof=TRUE) AND (skills<>computer) AND (job<>programmer))". In a complex query, such as this one, the results can sometimes be uncertain, requiring the user to make several attempts at creating the query to produce the correct results. Another disadvantage of queries, simple or complex, is that they can result in wasted time and space in obtaining commonly used data, and in creating a litany of queries which produce the same results and/or erroneous results.

A need exists, therefore, for meaningful and easy access to information in an information repository that provides the detail of information available from a custom program without the time and expense of creating one, as well as the cost-effectiveness of querying an information repository without the uncertainties of results and the inefficiencies in obtaining them. In a more general sense, a need also exists for a means of meaningful and easy access to information an information repository that presents a user with a conceptual view of the information repository.

SUMMARY OF THE INVENTION

The present invention solves this problem by providing a method and apparatus of creating a hierarchy of information that allows information in an information repository to be meaningfully and easily accessed. The invention described herein is an apparatus for accessing an information repository, comprising computer readable program code stored on computer readable media, where the computer readable program code comprises code for organizing information stored in the information repository into a hierarchy. The hierarchy comprises a number of derived containers that are generated in conformance with an information model comprising a hierarchy of container definition nodes. Each of the derived containers can correspond to a different one of the container definition nodes, represents a category of information in the information repository, and comprises contents. Furthermore, the invention described herein is a computer based method of accessing an information repository, comprising a computer creating a hierarchy of derived containers. The hierarchy comprises a hierarchy of a number of derived containers that correspond to container definition nodes of an information model comprising a hierarchy of container definition nodes, and that correspond to categories of information stored in the information repository. The computer determines if a given one of the derived containers has been selected by a computer user, and upon selection of a given derived container, displays contents of the given derived container.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which:

FIG. 7 illustrates a database with sample records and values.

FIGS. 8A, 8B, 8C, and 8D are sample hierarchy structures for the database of FIG. 7.

DESCRIPTION OF THE PREFERRED EMBODIMENTS

The invention described herein is an apparatus for accessing an information repository, comprising computer readable program code stored on computer readable media, where the computer readable program code comprises code for organizing information stored in the information repository into a hierarchy. The hierarchy comprises a hierarchy of a number of derived containers that are generated in conformance with an information model comprising a hierarchy of container definition nodes. Each of the derived containers corresponds to a different one of the container definition nodes, represents a category of information in the information repository; and comprises contents. Furthermore, the invention described herein is a computer based method of accessing an information repository, comprising a computer creating a hierarchy of derived containers. The hierarchy comprises a hierarchy of a number of derived containers that correspond to container definition nodes of an information model comprising a hierarchy of container definition nodes, and that correspond to categories of information stored in the information repository. The computer determines if a given one of the derived containers has been selected by a computer user, and upon selection of a given derived container, displays contents of the given derived container.

Introduction and Definitions

An information model can be created to define a hierarchy of information (also referred to as a hierarchy) for one or more information repositories to provide meaningful and easy access to information in the information repositories. An information model corresponds to a hierarchy, wherein the hierarchy represents a hierarchical and logical grouping of information in the information repositories. The present invention contemplates defining a single information model for multiple information repositories, multiple information models for a single information repository, as well as a single information model for a single information repository.

Figure 1:
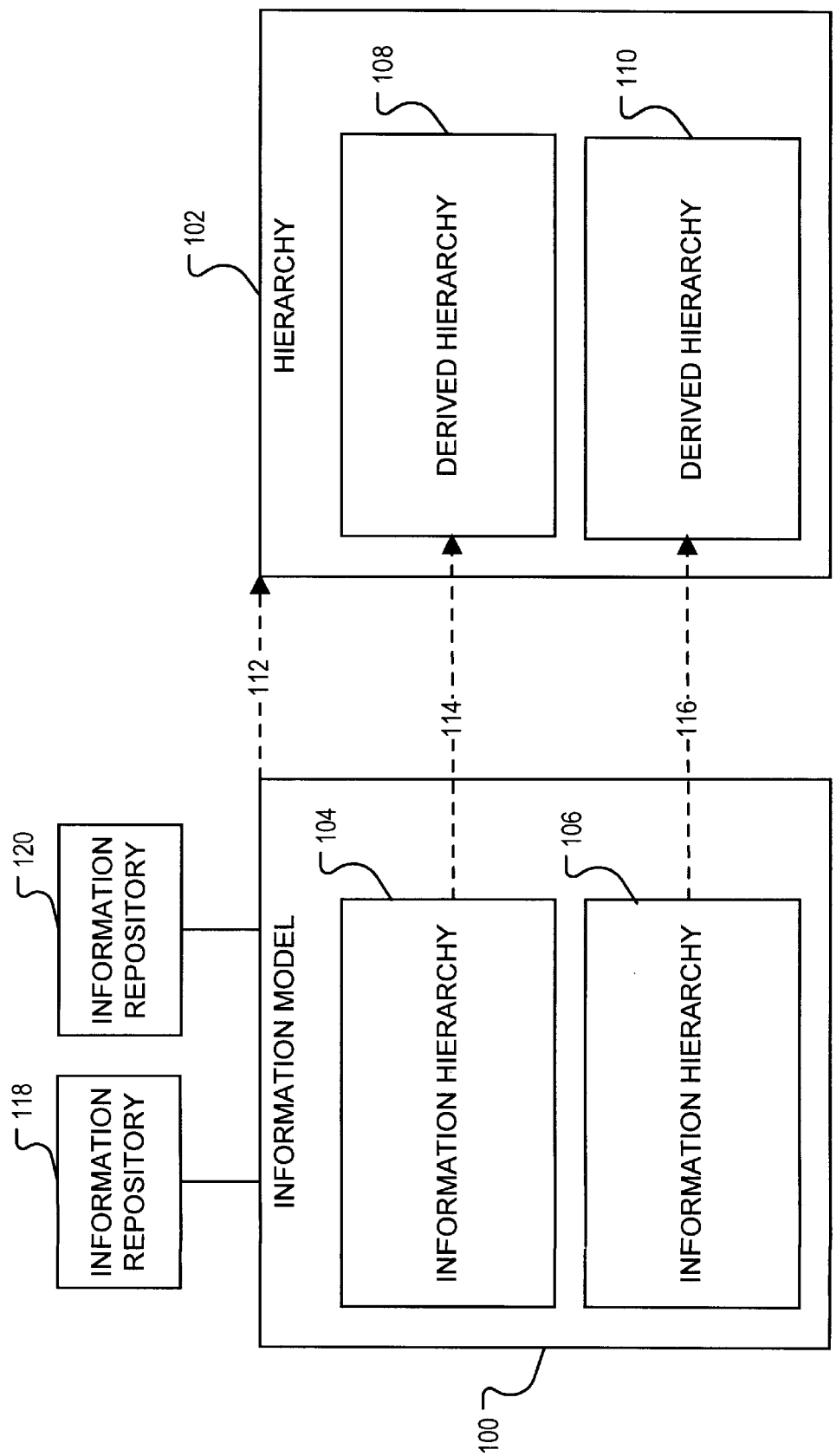
FIG. 1 illustrates the relationship between an information model and a hierarchy.

As illustrated in FIG. 1, an information model 100 corresponds 112 to a hierarchy 102 for one or more information repositories 118, 120 in a preferred embodiment, wherein a hierarchy is a logical and hierarchical grouping of information in the information repository. An information model 100 comprises one or more information hierarchies 104, 106 , and a hierarchy 102 comprises one or more derived hierarchies 108, 110, such that each information hierarchy 104, 106 corresponds 114, 116 to a derived hierarchy 108, 110 for an information repository 118.

Figure 2:
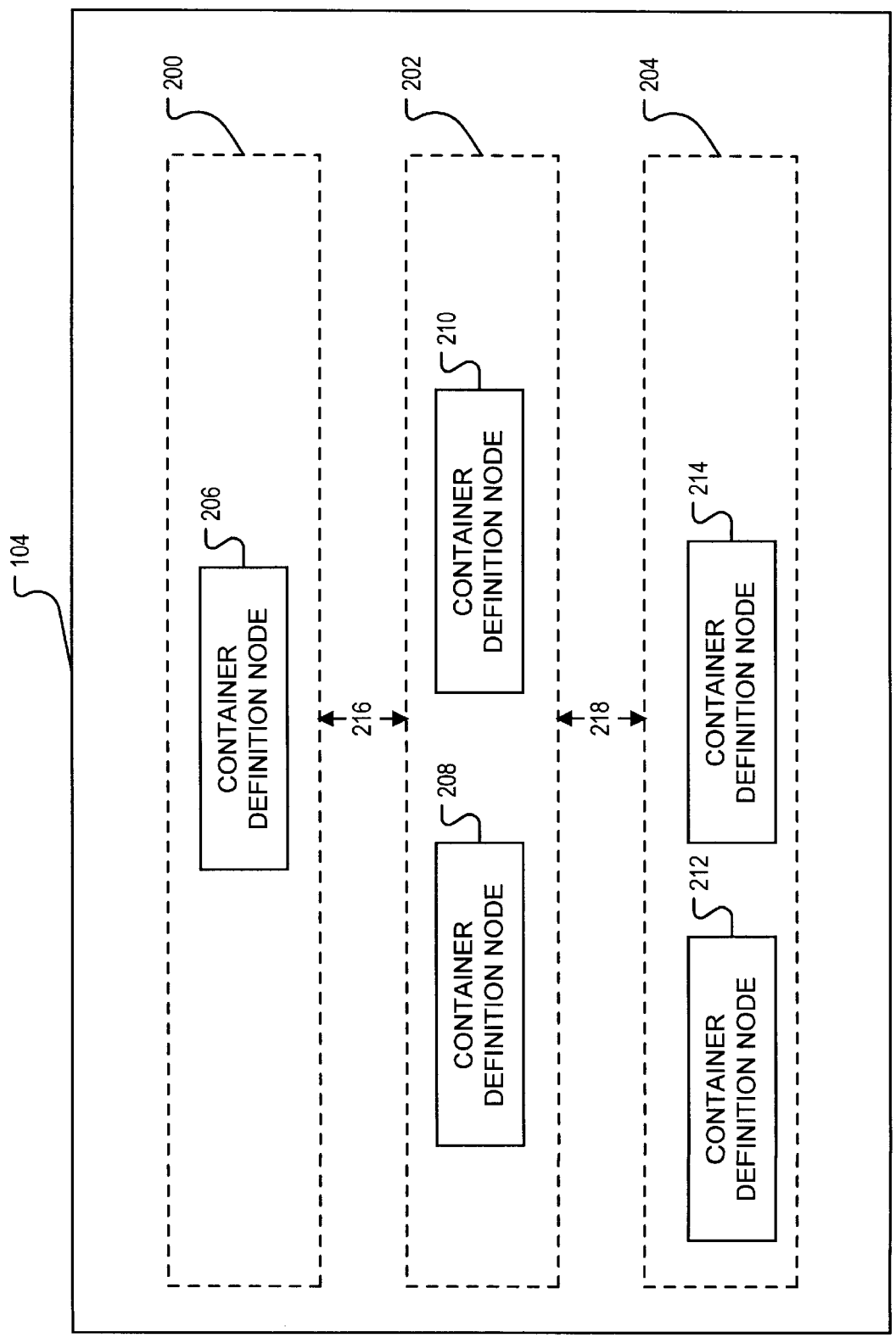
FIG. 2 illustrates container definition nodes and levels of information that comprise an information hierarchy in an information model, and the relationships between them.

As illustrated in FIG. 2, an information hierarchy 104 comprises one or more levels of information 200, 202, 204, and one or more container definition nodes 206, 208, 210, 212, 214 at each level of information, wherein a hierarchical relationship 216, 218 exists between a container definition node at one level of information and a container definition node at a second level of information, such that a container definition node at a higher level of information that points to a container definition node at a lower level of information is a parent container definition node (also referred to as parent node), and a container definition node at a lower level of information that is pointed to by a container definition node at a higher level of information is a child container definition node (also referred to as child node). Within a level of information, one or more container definition nodes referencing the same parent container definition node are referred to as a container group. In a preferred embodiment, a container definition node at a lower level of information provides more detail about a hierarchy than a container definition node at a higher level of information. All nodes in a lower level of information referenced by a given container definition node, directly or indirectly, are descendants of the given container definition node, and all nodes in a higher level of information than a given container definition node of which the given container definition node is a descendant, are ancestors of the given container definition node. A node in the first level of information of an information hierarchy is referred to simply as a first-level container definition node, and a node that does not reference any child nodes in an information hierarchy is referred to as a leaf node. Throughout the description, an information hierarchy will refer to one which starts at a first level of information, and includes a first-level container definition node, all child nodes of the first-level container definition node, and all descendants thereof, including leaf nodes.

Figure 3:
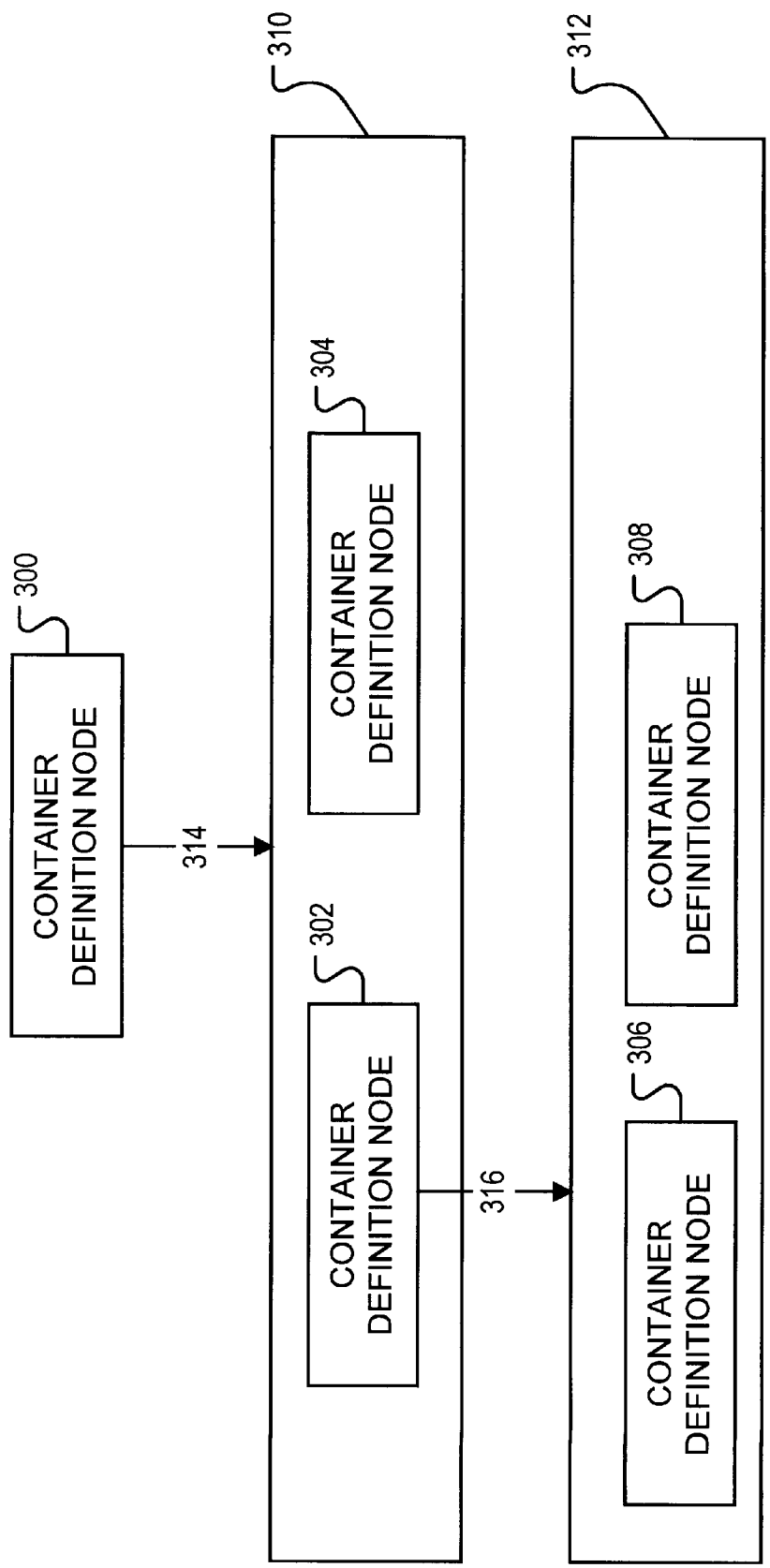
FIG. 3 illustrates a first example implementation of a parent/child relationship between container definition nodes in an information hierarchy, which is implemented in a preferred embodiment.
Figure 4:
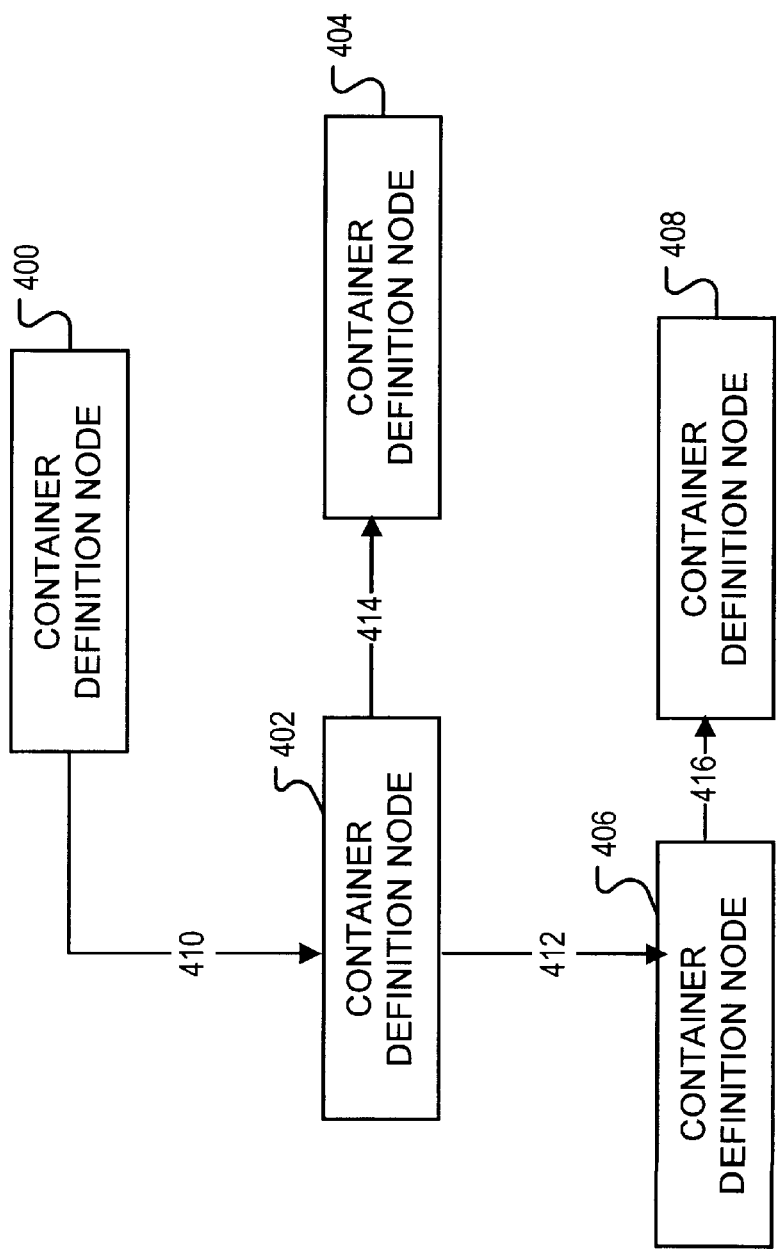
FIG. 4 illustrates a second example implementation of a parent/child relationship between container definition nodes in an information hierarchy.

There are various ways of implementing a hierarchical relationship between container definition nodes. In a preferred embodiment, as illustrated in FIG. 3, a hierarchical relationship is implemented by a container definition node that comprises a pointer to a list of all of its child nodes. Therefore, container definition node 300 is a parent node that comprises a pointer 314 to a list 310 of child nodes 302, 304, and container definition node 302 is a parent node that comprises a pointer 316 to a list 312 of child nodes 306, 308. In another implementation, as illustrated in FIG. 4, a container definition node comprises a pointer to a child node and/or a pointer to a peer node, rather than a pointer to a list of one or more child nodes. A peer node is a container definition node at the same level as that of the container definition node that comprises a pointer to the peer node. A peer node is also a child node of the parent node which comprises a pointer to a child node that is in the same level as the peer node, and in the same container group as the peer node. Therefore, container definition node 400 is a parent node that comprises a pointer 410 to a child node 402, which comprises a pointer 414 to peer node 404, and container definition node 402 is a parent node that comprises a pointer 412 to a child node 406, which comprises a pointer 416 to peer node 408. Also, container definition node 400 is a parent node of peer node 404, and container definition node 402 is a parent node of peer node 408. In both example implementations, nodes 300, 302, 400, 402 are parent nodes because they reference one or more child nodes; nodes 302, 304, 306, 308, 402, 404, 406, 408 are all child nodes and/or descendants because they are referenced by a parent node, directly or indirectly; nodes 300, 400 are first-level nodes; and nodes 304, 306, 308, 404, 406, 408 are leaf nodes since they do not reference any child nodes. Additionally, nodes 302, 402 are both parent nodes and child nodes, since they are both referenced by a parent node, and they both reference a child node.

Figure 5:
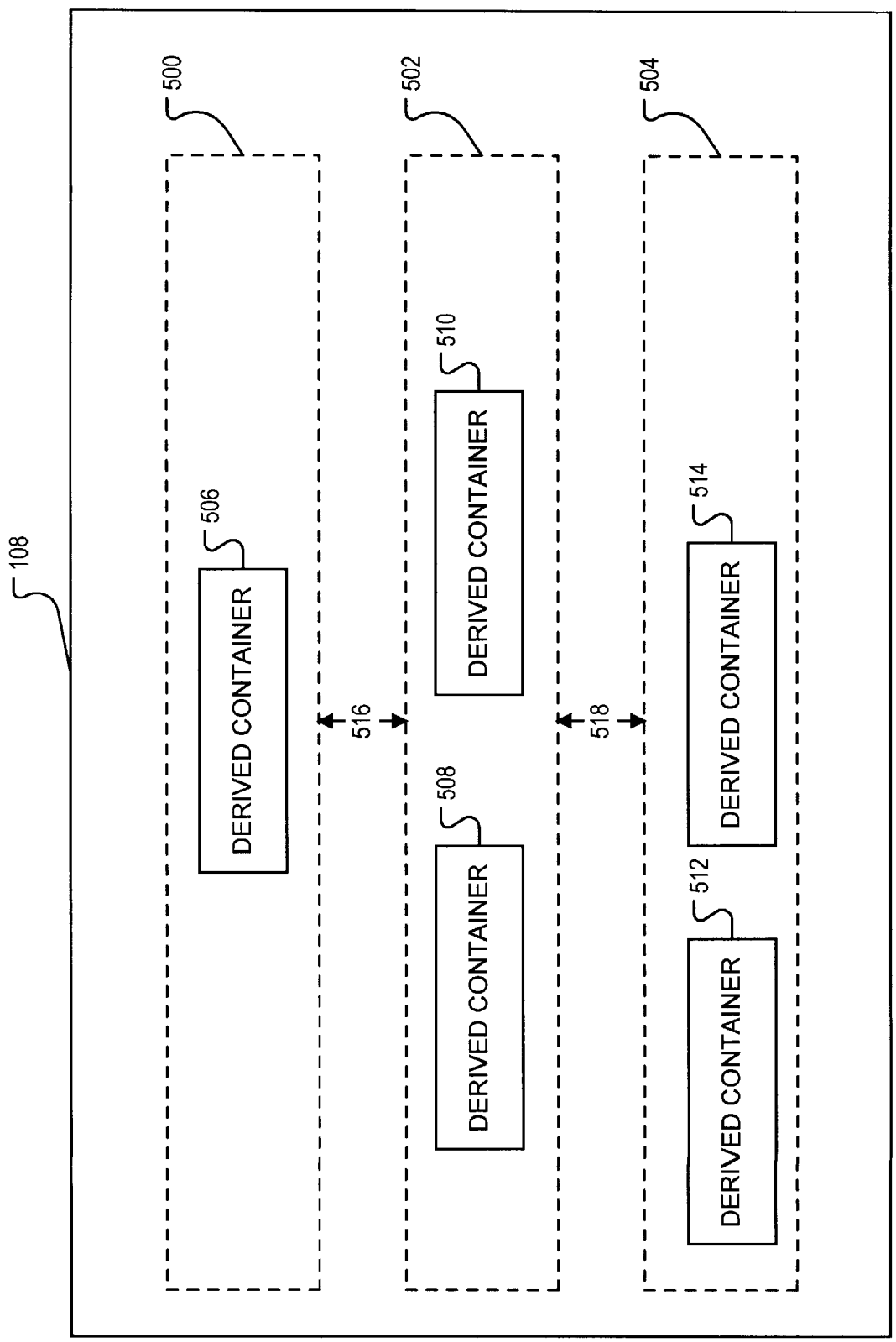
FIG. 5 illustrates derived containers and levels that comprise a derived hierarchy, and the relationships between them.

As illustrated in FIG. 5, a derived hierarchy 108 in a hierarchy comprises one or more levels 500, 502, 504 and one or more derived containers 506, 508, 510, 512, 514, wherein each level 500, 502, 504 corresponds to a level of information 200, 202, 204 in an information hierarchy 104, and each derived container 506, 508, 510, 512, 514 corresponds to a container definition node 206, 208, 210, 212, 214 in an information hierarchy 104. Furthermore, a hierarchical relationship 516, 518 exists between a derived container in one level and a derived container in a second level, such that a derived container at a higher level is a parent derived container (also referred to as a parent node) of a derived container at a lower level, and a derived container at a lower level is a child derived container (also referred to as a child node) of a derived container at a higher level. Within a level, one or more derived containers having the same parent derived container (as determined by hierarchical relationships of corresponding container definition nodes) are referred to as a container group. In a preferred embodiment, a derived container at a lower level provides more detail about a hierarchy than a derived container at a higher level. All nodes in a lower level of information referenced by a given derived container, directly or indirectly, are descendants of the given derived container, and all nodes in a higher level of information than a given derived container of which the given derived container is a descendant, are ancestors of the given derived container. A node in the first level of a derived hierarchy is referred to simply as a first-level derived container, and a node that does not reference any child nodes in a derived hierarchy is referred to as a leaf node. Throughout the description, a derived hierarchy will refer to one which starts at a first level, and includes a first-level derived container, all child nodes of the first-level derived container, and all descendants thereof, including leaf nodes.

Figure 6:
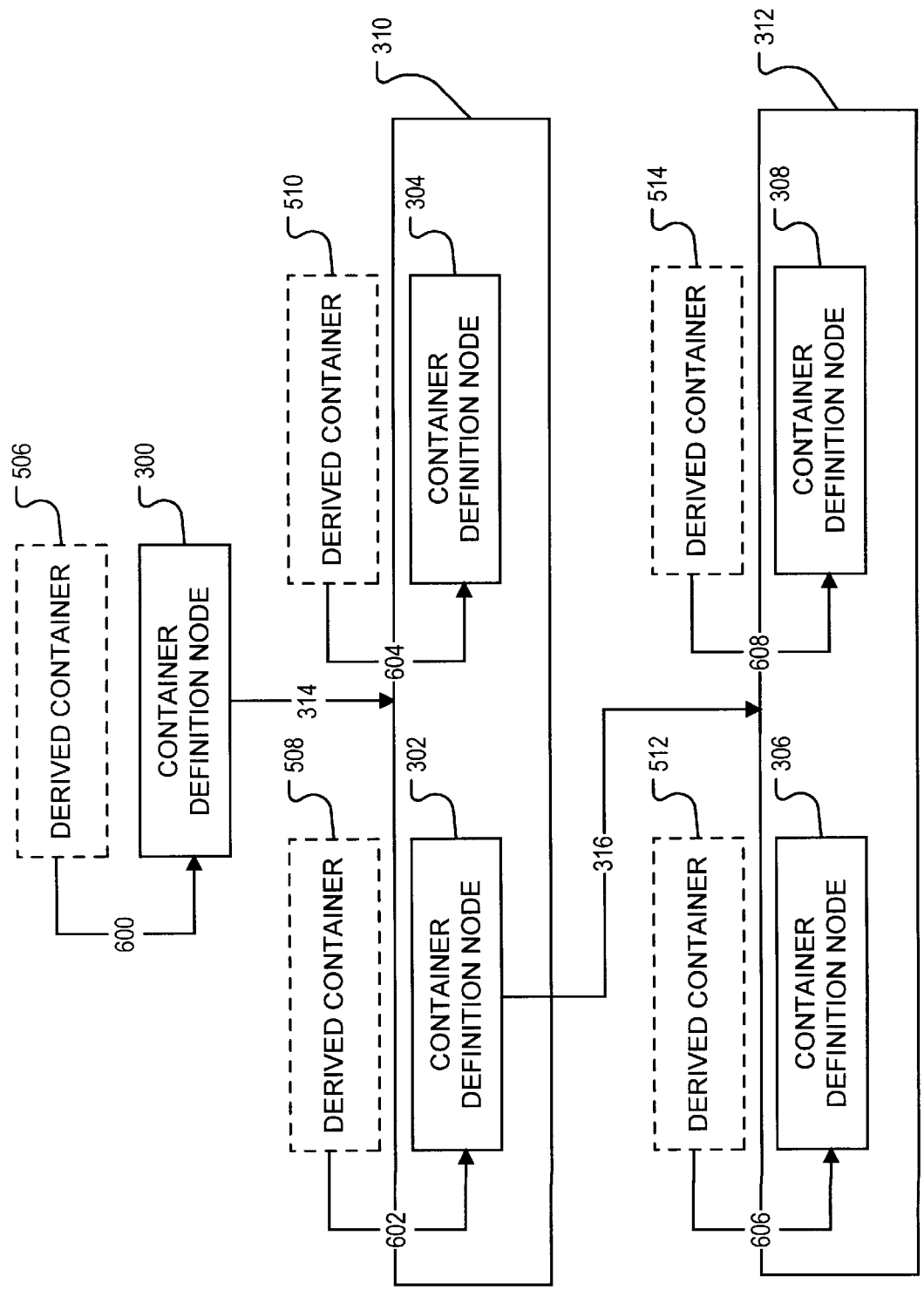
FIG. 6 illustrates the relationship between container definition nodes in an information hierarchy and corresponding derived containers in a hierarchy.

A hierarchical relationship between derived containers is implemented by each derived container referencing, or pointing to, a corresponding container definition node, thereby inheriting the hierarchical characteristics of its corresponding container definition node. FIG. 6, which shows a derived hierarchy generated in response to a preferred embodiment of a hierarchical relationship between container definition nodes (FIG. 3), illustrates this point. One of the events that transpires when a derived container is created from its corresponding container definition node is that a pointer for that derived container is created which points back to the container definition node it was derived from (hence the term "derived containers"). Therefore, when derived container 506 is created, pointer 600 is created to reference corresponding container definition node 300; derived container 508 references 602 corresponding container definition node 302; derived container 510 references 604 container definition node 304; derived container 512 references 606 corresponding container definition node 306; and derived container 514 references 608 corresponding container definition node 308. This creates a chain of pointers to determine one derived container's relationship to one or more other derived containers, such that a hierarchy comprising derived containers (FIG. 5) resembles a corresponding information hierarchy comprising container definition nodes (FIG. 2). Thus, derived container 506 is a parent node of derived containers 508 and 510 (by virtue of its reference to a corresponding container definition node and the child container definition nodes of the corresponding container definition node), and derived container 508 is a parent node of derived containers 512 and 514.

Using an information model to create a hierarchy allows the user to see two things. First, a hierarchy gives a user the ability to see how information in an information repository is organized and the relationship between information in the information repository via derived containers that represent user-defined categories of the information. Secondly, derived containers in a derived hierarchy allow a user to view logical subsets of information in the information repository. For example, an information model can be used to create a database hierarchy that hierarchically and logically presents information in a database to a user.

In presenting a hierarchical and logical view of information in a database, an information model allows a user to see two things. First, a hierarchy gives a user the ability to see how data in a database is organized and the relationship between data, i.e. fields, in the database. When a derived hierarchy is created in a preferred embodiment, derived containers are displayed such that hierarchical organization is conveyed to the user. In other words, a derived container can convey a category of information in the database as defined by its corresponding container definition node. A category of information corresponds to a field from the database from which its selection criteria is based, and the field can be used to create a label of the derived container. In a first embodiment, then, each derived container represents a category of information. Furthermore, if a derived container corresponds to a container definition node in the second level of information in the information model, a user interface can convey this sense of hierarchy by indenting the label of the derived container in a list user interface, or presenting a secondary window in a graphical window interface, for example.

Secondly, derived containers in a hierarchy allow a user to view logical subsets of database records, which are determined by a combined selection criteria attribute of a derived container. Records that are actually extracted from a database using a derived container's combined selection criteria attribute, as will be discussed, are referred to as extracted records. In a preferred embodiment, records are only extracted at a leaf derived container (or a derived container corresponding to a leaf container definition node), although it is also within the scope of this invention that records may be extracted at any derived container.

In summary, an information model defines how a hierarchy is presented to a user as determined by the contents of one or more derived containers, wherein the contents of a given derived container can comprise child derived containers (showing how information in an information repository is organized), extracted records (showing logical subsets of information), or both. In a preferred embodiment, the contents of a leaf derived container will comprise extracted records, and the contents of all other derived containers will comprise child derived containers, although it is also within the scope of this invention that the other derived containers may comprise both child derived containers and extracted records. Derived containers can take the form of text or graphics, and are displayed by a label attribute of each derived container (to be discussed). Furthermore, derived containers are objects that can be selected to traverse a hierarchy (or to traverse a derived hierarchy), which is the selection of one or more derived containers at one or more levels in order to view a hierarchy (or derived hierarchy). Selecting a derived container can occur when a user actively selects a derived container by its text or graphic, such as by placing a cursor over it and "right-clicking the mouse" or "hitting enter on the keyboard". Selecting a derived container can also occur when a dynamic update of a hierarchy occurs to automatically traverse the hierarchy at specified periods, so that as each level is traversed, one or more derived containers are selected. In presenting derived containers and their contents, a computer monitor is the preferred medium, and any form of a user interface for presenting the view is within the scope of this invention. Examples include, but are not limited to, a split screen arrangement like that used in Microsoft's® Explorer file browser, where the hierarchy can be displayed on the left and the contents of a selected derived container on the right; and Hewlett-Packard's® OpenView user interface, where there is a separate window for the contents of each derived container selected for viewing.

Throughout the drawing, container definition nodes in an information model are depicted as objects so that hierarchical relationships between container definition nodes can be illustrated. The hierarchical relationship used is the relationship illustrated in a preferred embodiment (FIG. 3). Derived containers are also depicted as objects similar in structure to their corresponding container definition nodes. In figures illustrating user-viewable elements, derived containers are shown only by their label. In these figures, a label can represent an actual derived container in a hierarchy and is the equivalent of a derived container object bearing the same label. These labels can also represent a derived container in a hierarchy structure, which is a blueprint from which a hierarchy is designed, and has the same characteristics of a hierarchy (i.e., it comprises derived containers, levels, etc.). Additionally, it is to be understood that all structures described herein (i.e. information models, hierarchies, information hierarchies, derived hierarchies, container definition nodes, derived containers, etc.) can have any number of conceivable representations (i.e. tree structures, list representations), as long as they are in conformance with the teachings herein.

Creating an Information Model

In a preferred embodiment, an information model is created for a single information repository that is a database. To better illustrate how this is accomplished, reference will be made to the job placement database of FIG. 7 (hereinafter "the job database") which comprises sample records and values for each record. In the job database, JobNo uniquely identifies each job in the database. Each unique identification of a record is also known as a database object, so that a reference to a particular JobNo record only references one record, whereas a reference to a particular Skills record such as Skills=COMP, which is not a database object, references several records. As is apparent from FIG. 7, it would be a cumbersome job for a user to make use of information in a database just by looking at it. For example, if a user wished to provide a client with all available jobs which required office skills, the user would first have to determine which jobs required office skills, and then have to determine if that job was available (or vice versa). It is a cumbersome task for a sample set of thirteen records, but virtually an impossible task for a database in a practical application which can have hundreds to thousands of records. One way to meaningfully access information from this database is through a custom program and video that could, for instance, display any single job or combination of jobs from the job database. A disadvantage of this method is that a custom program requires an expenditure of time, money, and expertise, which is unnecessary for many uses. For simpler uses, queries could be written for this database. One disadvantage to this is that a query can oftentimes produce unpredictable and incorrect results, due to a user's failure to understand the general organization and make-up of a database. Another disadvantage is that time and space can be wasted as a result of creating multiple queries that produce the same results, queries that are incorrect, and queries that are commonly used.

An information model of the present invention is somewhat of a hybrid between a custom program and a set of queries that is used to create a hierarchy. In creating an information model, the organization of a database or other information repository is customized so that a hierarchy that is meaningful to a user can be created. Although it is "customized", an information model does not require a designer to know a particular programming language, and is therefore much less time consuming and easier to implement. Like queries, container definition nodes of an information model can comprise one or more selection criteria to determine records to select (via a combined selection criteria of its derived container). However, because of the hierarchical structure of an information model, and therefore the divisibility of information used in selection criteria, queries are easier to assemble and the results are more predictable.

To create an information model, it is useful to define the information model in reference to a desired, or a resulting hierarchy. Therefore, in describing the process of creating an information model, a hierarchy structure refers to the structure of a resulting hierarchy, and its elements (i.e. derived containers, levels) and characteristics thereof refer to that which the resulting hierarchy should possess. As a result, the terms "hierarchy", "hierarchy structure", and "resulting hierarchy" are sometimes used interchangeably.

Assume that an information model is to be created for the hierarchy structure of FIG. 8A, wherein each line is a derived container represented by its label, and each level of indentation represents a level in the hierarchy. This derived hierarchy (hereinafter "derived hierarchy Available" 800), which is a fully traversed hierarchy (i.e., one in which all derived containers of the derived hierarchy have been traversed by a user, or opened-up), could provide a user with useful information about all of the available jobs from the job database. The structure is organized such that as a lower level in the hierarchy is reached, a derived container at that lower level provides more detail about the hierarchy than does a derived container at a higher level. This equates to comprising the same as or a fewer number of records to select than at a higher level. For example, derived container Available 802 in the first level can be defined to comprise all records representing available jobs, so that all records can be extracted except for Job's 702, 704, 705 and 708. (The Available derived hierarchy 800, which comprises derived containers at one or more levels, should not be confused with the Available derived container 802.)

Derived container Tech/Prof 804 in the second level can be defined to refine the hierarchy to only describe available jobs that are also technical/professional (i.e., by adding to its combined selection criteria), such that only three records can be extracted, JobNo's 1000, 1006, and 1011. (Although the selection criteria for the Tech/Prof container definition node 1216 (FIG. 12A) corresponding to the Tech/Prof derived container 804, for example, is (field: Tech/Prof=TRUE) which would generate five records, JobNo's 700, 704, 705, 706, and 711, records that can be extracted at a derived container are determined by the derived container's combined selection criteria, which in this case is ((field:IsAvailable=TRUE) AND (field: Tech/Prof=TRUE)). This combined selection criteria would eliminate JobNo's 1004 and 1005 even though these records satisfy the selection criteria for the container definition node, leaving JobNo's 1000, 1006, and 1011 as the records that can be extracted at second-level derived container Tech/Prof.) Note that where the repository is a database, each record that can be extracted is a database object. Other derived hierarchy structures that can be defined for the job database are illustrated in FIGS. 8B, 8C, and 8D.

The derived hierarchy structures of FIGS. 8A, 8B, 8C, and 8D can comprise a hierarchy structure individually, or can together comprise a hierarchy structure for the job database. Additionally, these derived hierarchies can in various combinations comprise a hierarchy, as illustrated in FIGS. 8A and 8B, which together comprise a hierarchy. (Practically speaking, in a preferred embodiment, a hierarchy structure would comprise all derived hierarchy structures, as well as other possible derived hierarchy structures not displayed. For simplicity of illustration, however, only two derived hierarchy structures are defined for the sample hierarchy.) A first derived hierarchy, as illustrated in FIG. 8A, describes jobs that are available (hereinafter the "Available derived hierarchy" 800 of FIG. 8A), where the Available derived hierarchy 800 comprises first-level derived container Available 802; second-level derived containers Tech/Prof 804, Office 814, and Trade 818; third-level derived containers Computers 806, Electronics 812, Secretary 816, and Plumber 820; and fourth-level derived containers Repairer 808, Programmer 810, Grade I 822, and Grade II 824. A second derived hierarchy, as illustrated in FIG. 8B, describes technical and professional jobs (hereinafter the "Tech/Prof derived hierarchy" 826 of FIG. 8B), where the Tech/Prof derived hierarchy 826 comprises first-level derived container Tech/Prof 828; second-level derived containers Computers 806 and Electronics 812; and third-level derived containers Repairer 808 and Programmer 810. The Available and Tech/Prof derived hierarchies 800, 826 which comprise derived containers at one or more levels, should not be confused with the Available and Tech/Prof derived containers 802, 828. Likewise, the Available and Tech/Prof information hierarchies, which comprise container definition nodes at each level of information, should not be confused with the Available and Tech/Prof container definition nodes.

Figure 9:
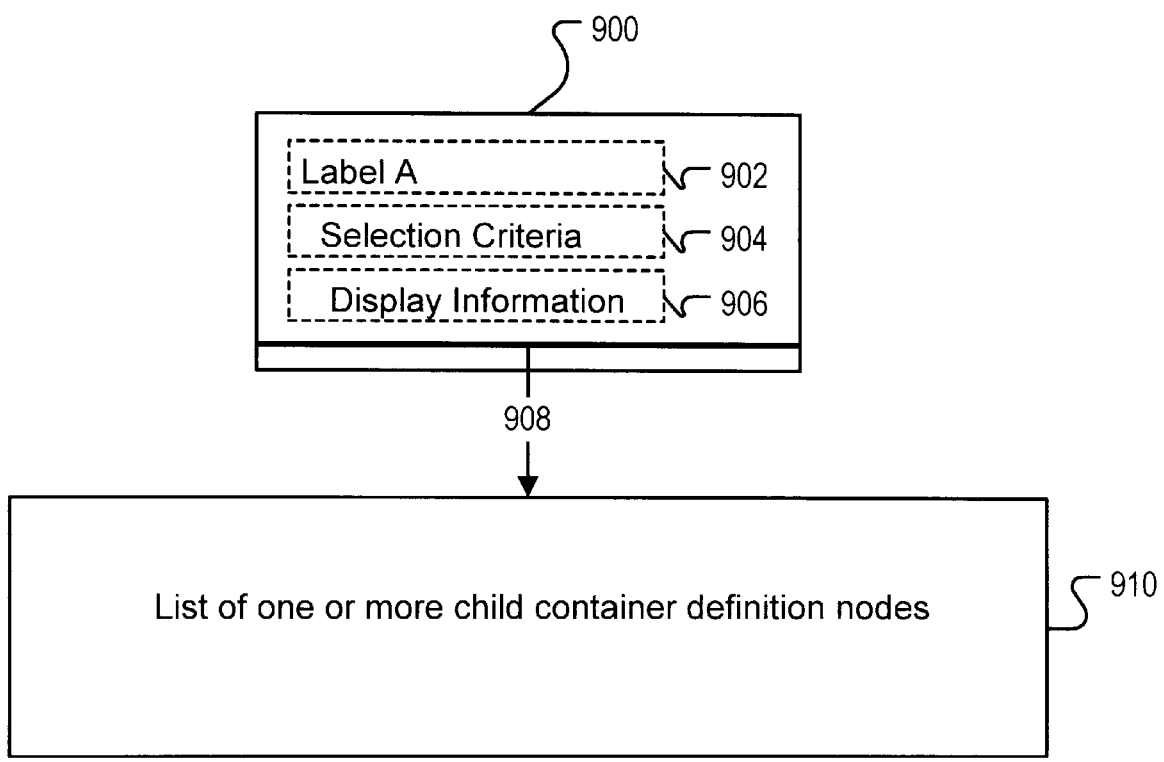
FIG. 9 illustrates a container definition node structure.

To generate the hierarchy structure of FIGS. 8A and 8B, an information model is created by defining a container definition node for each derived container of the structure since each derived container in a derived hierarchy corresponds to a container definition node in an information hierarchy. As illustrated in FIG. 9, a container definition node 900 is an object that comprises attributes related to creating a hierarchy of information. In a preferred embodiment, a container definition node 900 comprises a label attribute 902 which is displayed to a user. A container definition node can also comprise a selection criteria attribute 904 that is used to refine a hierarchy by filtering information, and a display information attribute 906 to determine how a derived container will be displayed to a user to convey hierarchy. The selection criteria attribute can comprise a single statement, or one or more statements joined by a Boolean word (i.e., AND, OR, XOR, etc.). A container definition node also comprises a pointer 908 to a list 910 of one or more child container definition nodes (not shown). Whatever the particular attributes of a container definition node are, they are not limited to those described herein, but are related to creating a hierarchy of information and may be dependent upon the particular information repository being organized.

Figure 10:
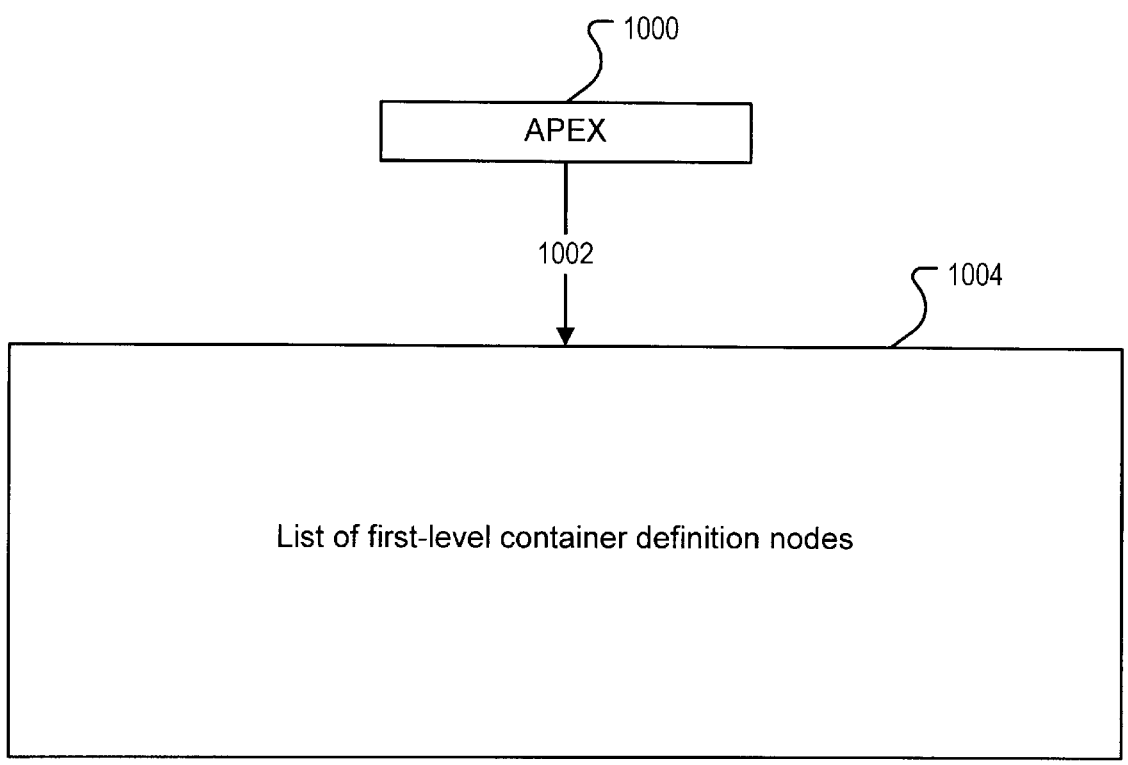
FIG. 10 illustrates an apex of an information model.

Also in a preferred embodiment, as illustrated in FIG. 10, an apex 1000, which is an object comprising a pointer 1002, is created to access a list 1004 of first-level container definition nodes. In a variation of this embodiment, an apex can also comprise one or more pointers, wherein each pointer references a first-level container definition node, rather than a list of first-level container definition nodes. This invention contemplates accessing first-level container definition nodes in other ways, as well. For instance, rather than obtaining first-level container definition nodes from an apex, a subroutine could determine what the first-level container definition nodes are based upon a container definition node's display information, or other attributes contemplated but not described herein, such as a level attribute.

Figure 11:
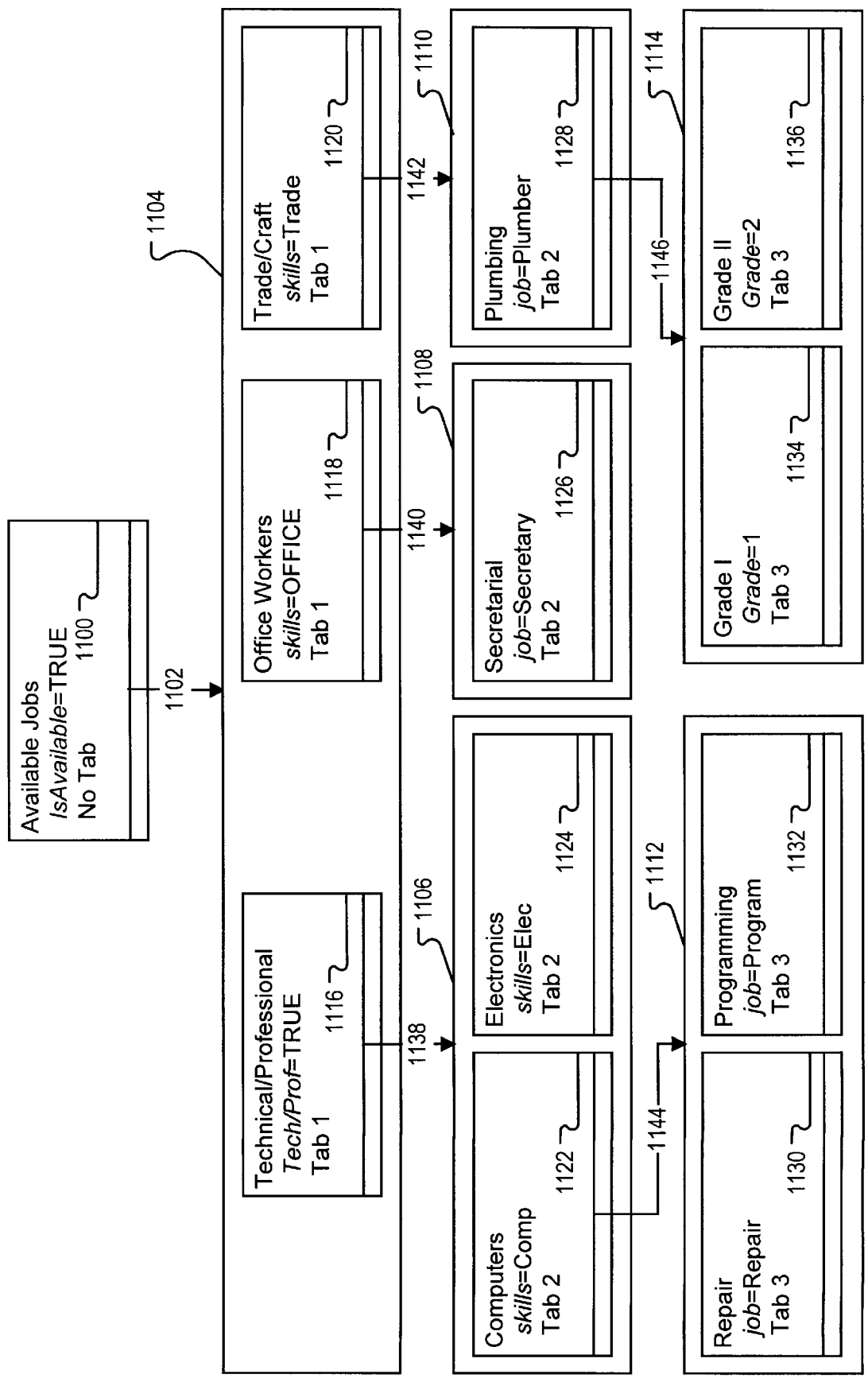
FIG. 11 is a sample information hierarchy for the derived hierarchy of FIG. 8A.
Figure 12:
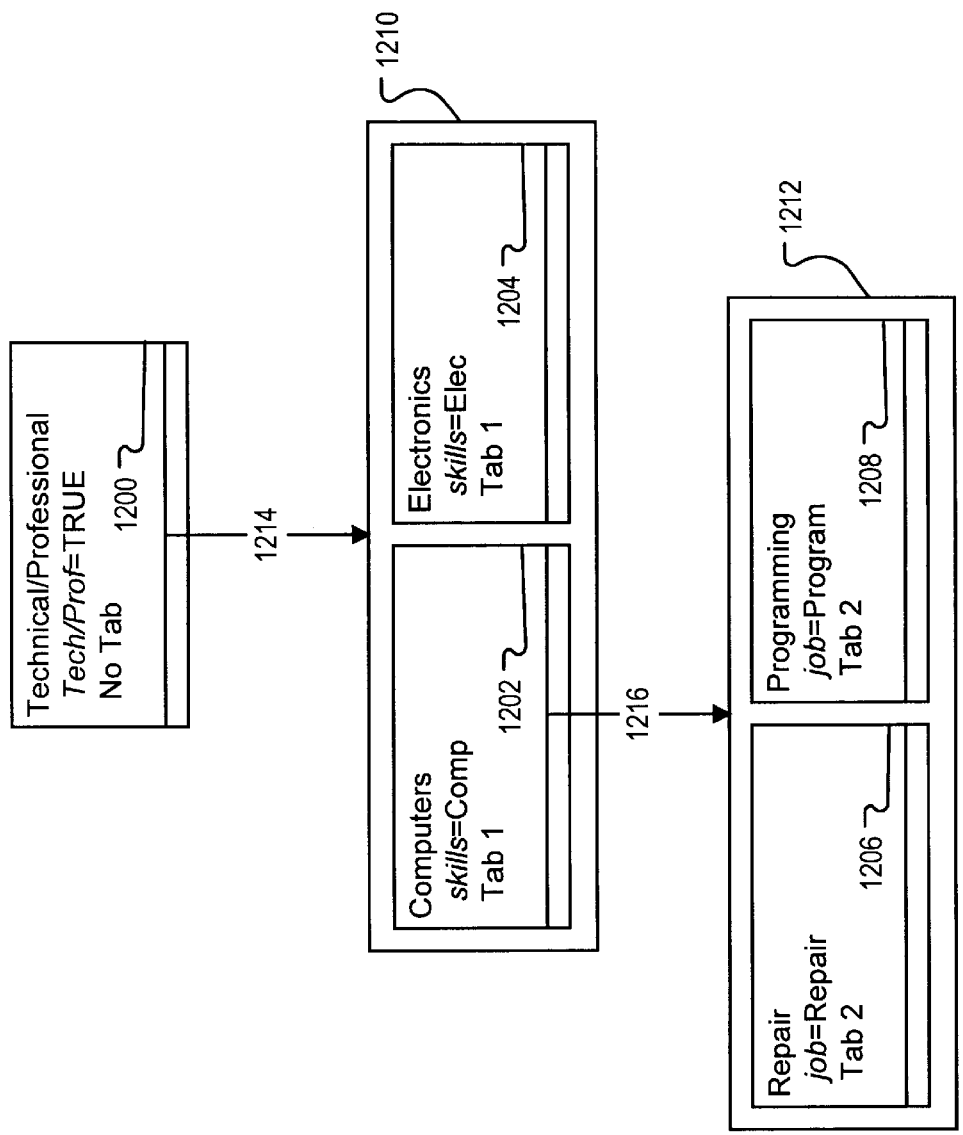
FIG. 12 is a sample information hierarchy for the derived hierarchy of FIG. 8B.

An information model for the hierarchy structure of FIGS. 8A and 8B is illustrated in FIG. 11 and FIG. 12, wherein the information hierarchy of FIG. 11 corresponds to the Available derived hierarchy 800 of FIG. 8A, and the information hierarchy of FIG. 12 corresponds to the Tech/Prof derived hierarchy 826 of FIG. 8B. In FIG. 11, the Available information hierarchy comprises twelve container definition nodes 1100, 1116, 1118, 1120, 1122, 1124, 1126, 1128, 1130, 1132, 1134, 1136, six of which are parent nodes 1100, 1116, 1118, 1120, 1122, 1128 comprising pointers 1102, 1138, 1140, 1142, 1144, 1146 to a list 1104, 1106, 1108, 1110,

1112, 1114 of child nodes. In FIG. 12, the Tech/Prof information hierarchy comprises five container definition nodes 1200, 1202, 1204, 1206, 1208, two of which are parent nodes 1200, 1202 comprising pointers 1214, 1216 to a list 1210, 1212 of child nodes. Each label of the container definition nodes in FIGS. 11 and 12 corresponds to a label of the derived containers in FIGS. 8A and 8B. Display information in a container definition node further defines how its corresponding derived container will be displayed. For instance, display information described as "Tab 1" will cause the label of that derived container to be tabbed once, like the Office derived container 814 in FIG. 8A. Selection criteria defined for the container definition nodes will determine, together with the combined selection criteria for a parent derived container, which database records can be extracted at the corresponding derived container when a derived container is selected.

In a preferred embodiment, a selection criteria attribute is used by a program to construct a query. Depending upon the database and database language being used, a container definition node might not comprise selection criteria if its corresponding derived container is merely descriptive. For instance, assume that a first-level derived container All Jobs has no selection criteria. Since combined selection criteria in a first-level derived container match the selection criteria for the derived container's corresponding container definition node, the combined selection criteria for All Jobs would render every record in the database a record that can be extracted at its derived container because there is no selection criteria to filter the database records. On the other hand, in a first-level derived container such as Available 802 (FIG. 8A) where selection criteria for its corresponding container definition node 1100 (FIG. 11) is set to {IsAvailable= TRUE}, combined selection criteria would render records eligible to be extracted only if they match the combined selection criteria (which in this case is also the selection criteria for the container definition node) for the derived container. In any case, a derived container which is descriptive is called a placeholder. Selection criteria in a container definition node corresponding to a placeholder can either be: 1) completely omitted, in which case certain databases will understand this to mean that "all records can be extracted at this point"; or 2) written in the appropriate database language so that it will be interpreted to mean "all records can be extracted at this point", such as a designation of <fieldname>=ALL or <fieldname>=*, for example. In the case where selection criteria is completed omitted, the selection criteria attribute of the container definition node is set to "null" or its equivalent. Selection criteria and combined selection criteria will be described in more detail in the following section.

Using an Information Model

Figure 13:
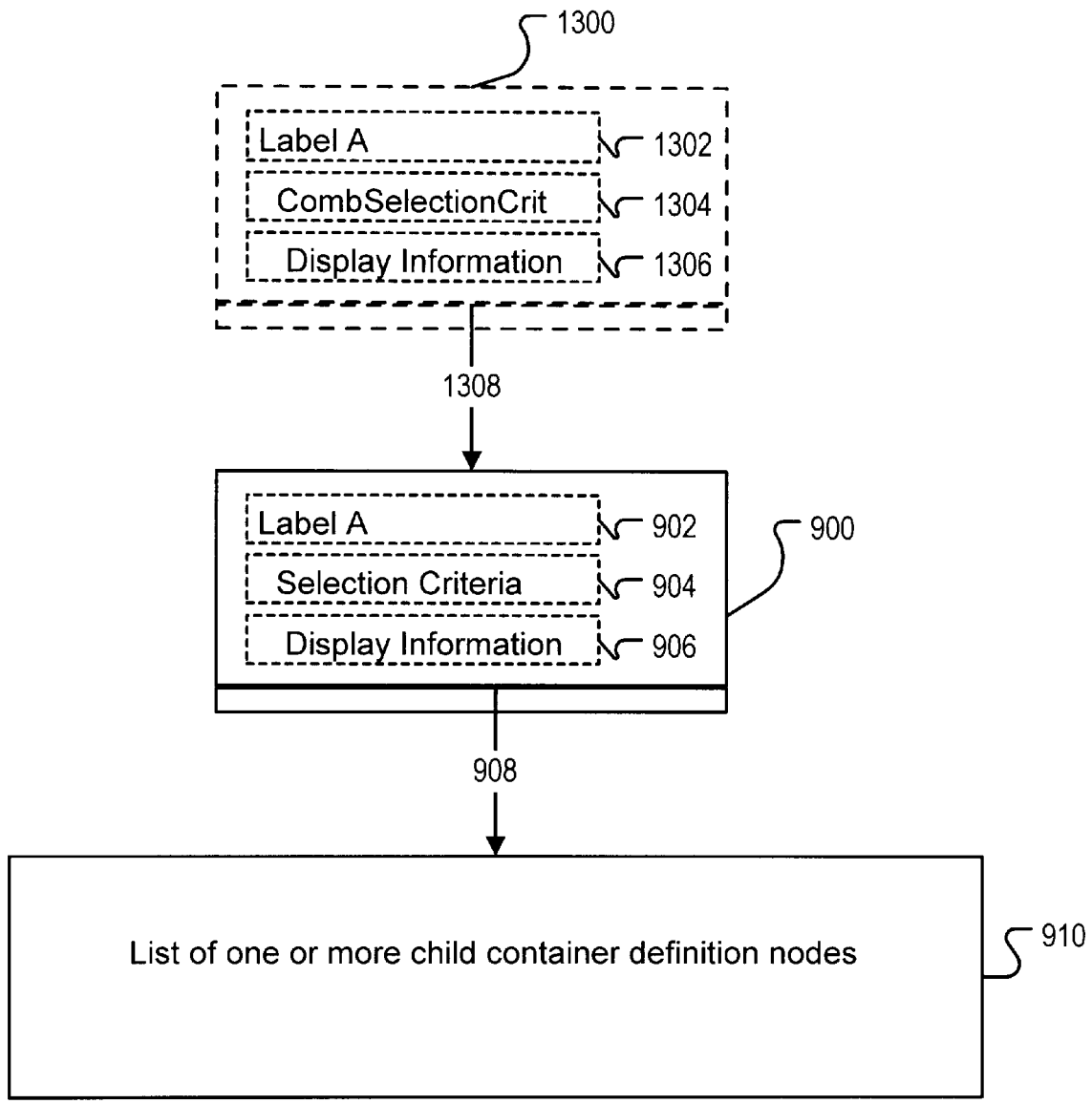
FIG. 13 illustrates a derived container structure and its relationship to a corresponding container definition node.

When an information repository embodied by an information model is initially accessed, such as when a computer is switched on, or an application utilizing the information repository is accessed, an associated hierarchy is initialized by creating and displaying first-level derived containers. FIG. 10 illustrates how this is accomplished in a preferred embodiment, wherein an apex 1000 points 1002 to a list 1004 of first-level container definition nodes. The first-level container definition nodes are then used to create corresponding derived containers. A derived container is similar in form to its corresponding container definition node, but different in content. As illustrated in FIG. 13, a derived container 1300 inherits attributes from its corresponding container definition node 900. In a preferred embodiment, these attributes comprise a label attribute 902 which is viewable by a user, and can also comprise a selection criteria attribute 904 to determine which records can be extracted at a derived container; and a display information attribute 906 to determine how a particular derived container is displayed in order to convey hierarchy to a user. A label attribute 902 of a corresponding container definition node 900 is inherited by a derived container 1300 to create its label attribute 1302, and a display information attribute 906 of a corresponding container definition node 900 is inherited by a derived container 1300 to create its display information attribute 1306. The selection criteria attribute 904 of a corresponding container definition node 1300 is inherited by a derived container 1300, along with the selection criteria of ancestral container definition nodes, to create its combined selection criteria attribute 1304, which determines information that can be extracted at a derived container. A derived container's combined selection criteria is created by combining its implied selection criteria attribute, as inherited from its corresponding container definition node, with the combined selection criteria attribute of the derived container's parent. A derived container 1300 can also comprise a pointer 1308 to its corresponding container definition node 900, for determining its contents when the derived container 1300 is selected. Therefore, in maintaining a hierarchical relationship between derived containers in a hierarchy, derived containers 1300 do not access child nodes, if any, directly via a pointer, as do container definition nodes 900. Instead, a hierarchical relationship between derived containers is maintained by the derived containers 1300 accessing child nodes via pointers 1308 which establish a "map" of where child nodes are located. This "map" is established by a particular derived container's 1300 corresponding container definition node 900, which points 908 to a list 910 of child nodes (not shown).

Figure 14:
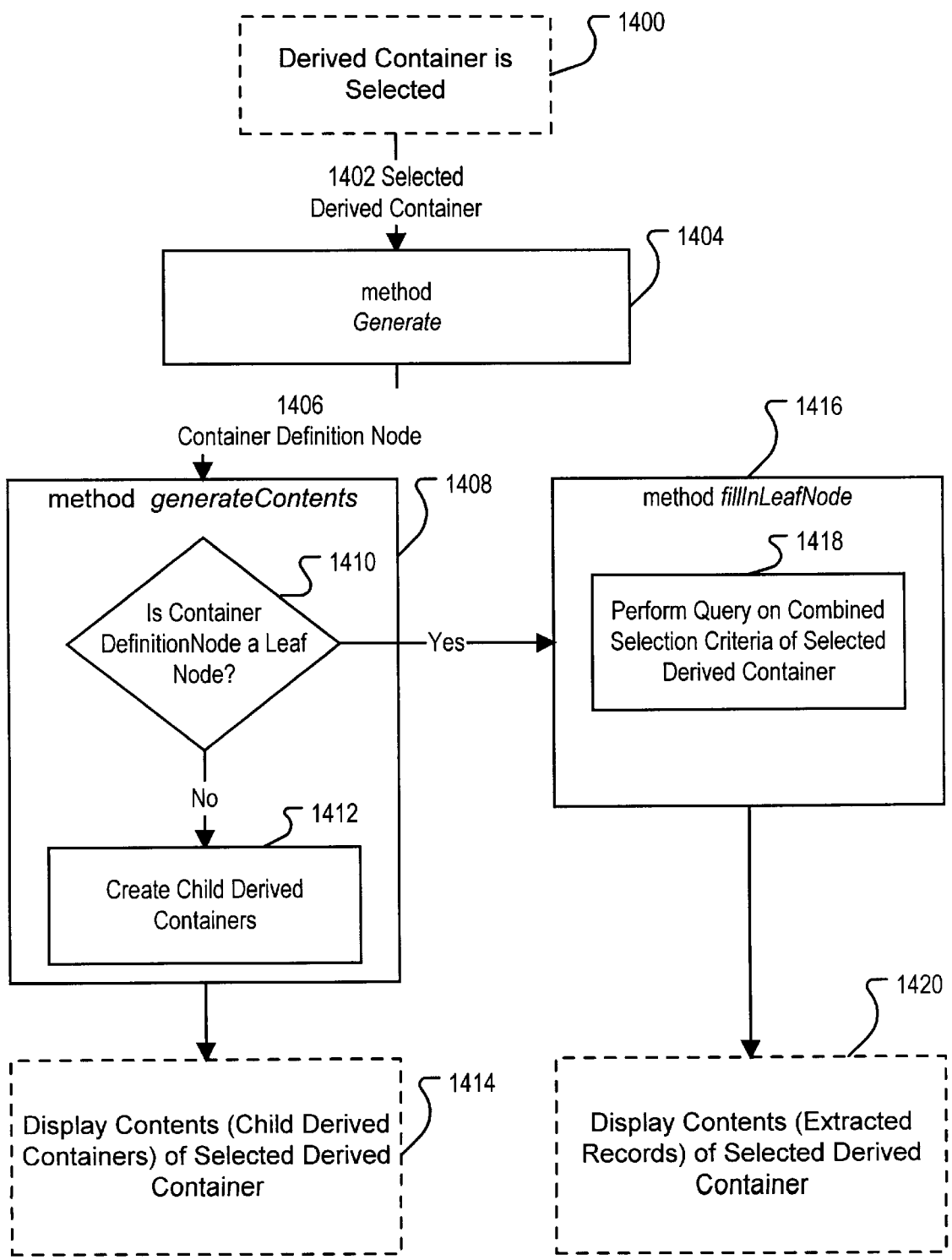
FIG. 14 illustrates a method of using an information model.

When a derived container is created, its label is displayed in an appropriate format indicated by the derived container's display information. Once the first-level of the hierarchy has been created (i.e. the first-level derived containers have been displayed), a derived container can be selected to traverse the hierarchy. This method is illustrated in FIG. 14. When a derived container is selected 1400, method Generate 1404 is invoked. Method Generate uses the selected derived container's 1402 pointer to retrieve its corresponding container definition node 1406 from the information model. Method generateContents 1408, which creates the contents of a selected derived container, then uses the corresponding container definition node 1406 and checks 1410 if the container definition node is a leaf node. (One way to determine if a container definition node is a leaf node is to check if it has pointers to child nodes. If it has pointers to child nodes, then it is not a leaf node. There can also be other ways of making this determination.) If the container definition node 1406 corresponding to the selected derived container 1402 is a leaf node, method fillInLeafNode 1416 is invoked to determine the selected derived container's contents by performing a query based on the selected derived container's combined selection criteria and extracting those records. The contents of the selected derived container are then displayed 1420 to a computer monitor. If the container definition node corresponding to the selected derived container is not a leaf node, the selected derived container's contents comprise child derived containers, and method generateContents 1408 creates 1412 a child derived container for each child container definition node that the corresponding container definition node points to. Each child container definition node becomes a child derived container, and the selected derived container becomes a parent derived container of child derived containers created therefrom. A child derived container is created by inheriting its corresponding container definition node's attributes, such as a label attribute, a display information attribute, and a selection criteria attribute; creating a combined selection criteria attribute by using the Boolean operator AND on the child container definition node's selection criteria and the parent derived container's combined selection criteria; and setting the child derived container's pointer to its corresponding container definition node. In alternative embodiments, other Boolean operators, such as NOT and OR, may be used on selection criteria to define the hierarchy. The method described above may also be employed, as is or modified, to create firstlevel derived containers.

Figure 15:
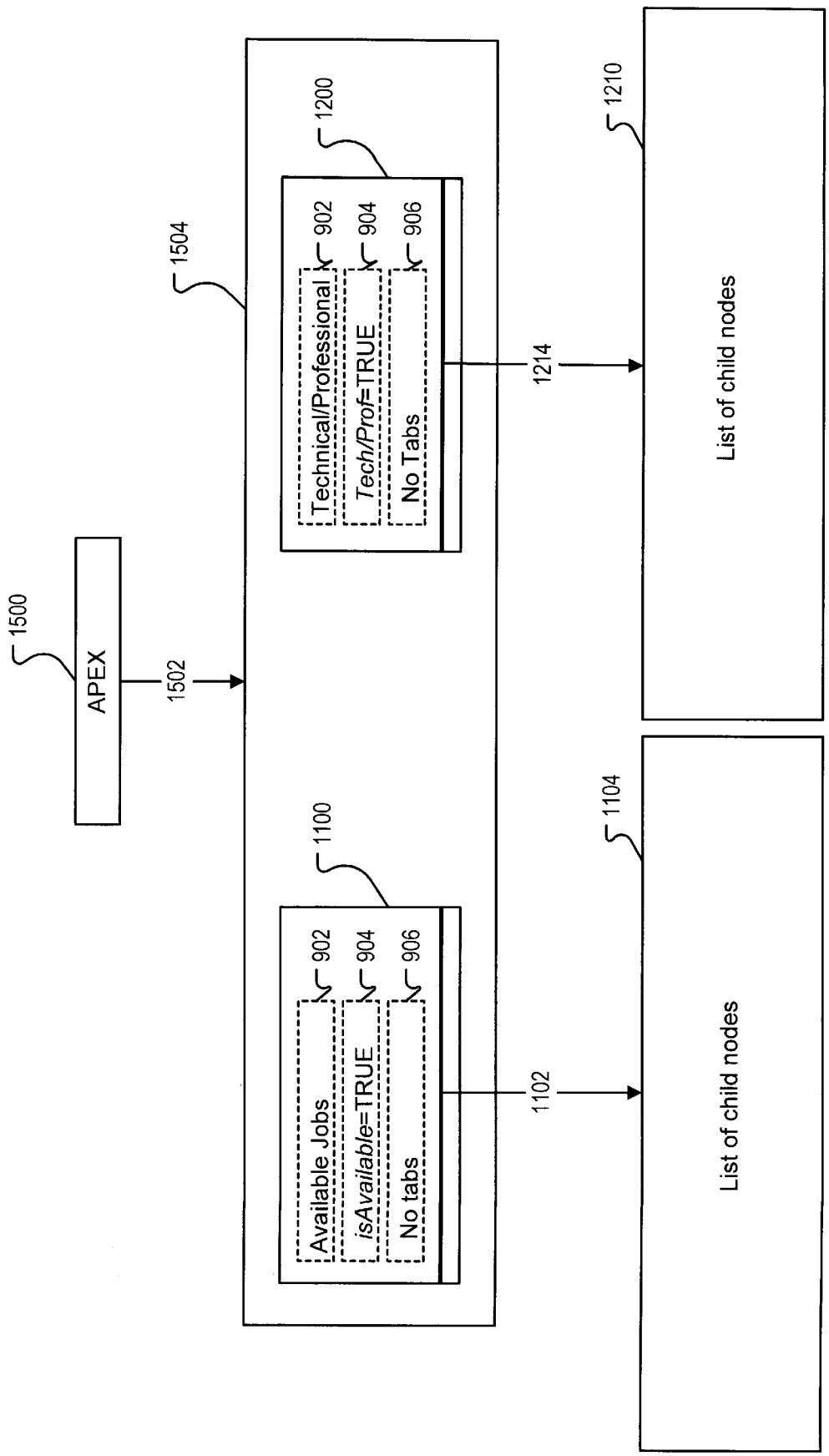
FIG. 15 illustrates an apex and first-level container definition nodes for the hierarchy represented by FIGS. 8A and 8B.
Figure 16:
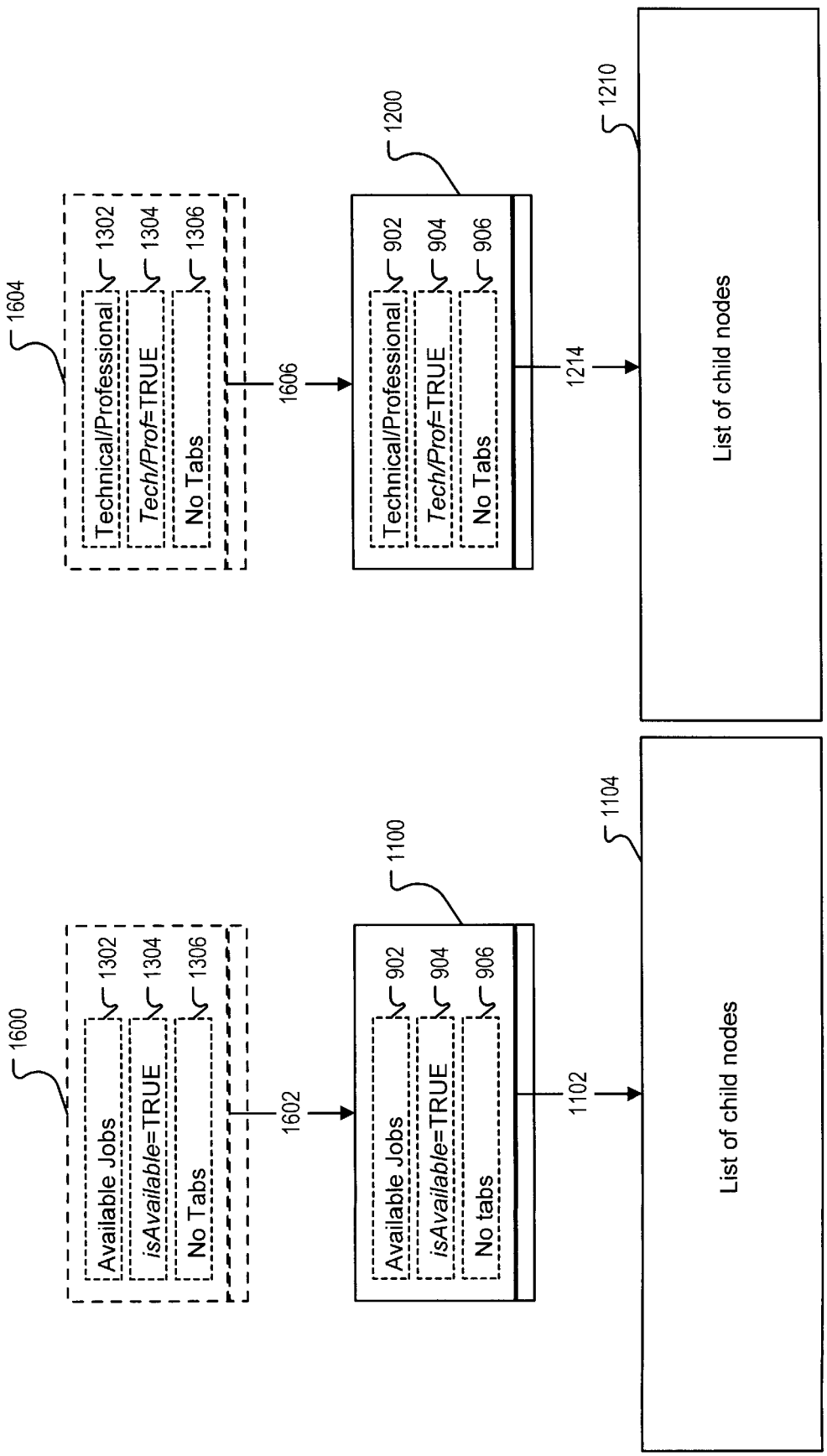
FIG. 16 illustrates first-level derived containers and their corresponding container definition nodes for the hierarchy represented by FIGS. 8A and 8B.

This method can be illustrated by way of example in a preferred embodiment wherein the information repository is a database. When a database is initially accessed, the apex of the database's information model is accessed to determine first-level derived containers that are displayed. FIG. 15 illustrates this for the hierarchy of FIGS. 8A and 8B, wherein an apex 1500 points 1502 to a list 1504 comprising the Available container definition node 1100 of FIG. 11 and the Tech/Prof container definition node 1200 of FIG. 12, each of which comprise pointers 1102,1214 to a list 1104, 1210 of child nodes. From container definition node attributes such as the label attribute 902, selection criteria attribute 904, and display information attribute 906, first-level derived containers 1600,1604 are created as shown in FIG. 16. The attributes 1302, 1304, 1306 of the derived containers 1600, 1604 of FIG. 16 are inherited from the attributes 902, 904, 906 of their corresponding container definition nodes 1100, 1200. The derived containers 1600, 1604, however, comprise pointers 1602,1606 to their corresponding container definition nodes 1100,1200 rather than pointers to a list of child derived containers.

The Available derived container 1600 shown in FIG. 16 corresponds to the Available derived container 802 (depicted by the derived container's label) in FIG. 8A. The display information 1306 for the Available derived container indicates that the label for the derived container is not to be tabbed, so that when it is displayed, it conveys a first-level of the hierarchy. The combined selection criteria {IsAvailable=TRUE} indicates that JobNo's 1000, 1001, 1003, 1006, 1007, 1009,1010, 1011, and 1012 of the job database of FIG. 7 can be extracted at this point. Similarly, the Tech/Prof derived container 1604 shown in FIG. 16 corresponds to the Tech/Prof derived container 828 (depicted by the derived container's label) of FIG. 8B.

The display information 1306 for the Tech/Prof derived container also indicates that the label for the derived container is not to be tabbed. The combined selection criteria {Tech/Prof=TRUE} indicates that JobNo's 1000, 1004, 1005, 1006, and 1011 of the job database of FIG. 7 can be extracted at this point. In a preferred embodiment, however, records are only extracted if the derived container is a leaf node. Since the Available derived container 802 and the Tech/Prof derived container 828 are not leaf nodes, records are not extracted. In other embodiments, however, records can be extracted at any derived container.

Using the method of FIG. 14, a user can select one of these first-level derived containers to traverse the hierarchy. If, for example, a user selects 1400 first-level derived container Tech/Prof 1604 (FIG. 16) (by its label 828 in FIG. 8B), method Generate 1404 uses the selected derived container's (i.e. derived container Tech/Prof 1604) pointer 1606 to obtain its corresponding container definition node 1200 which comprises a pointer 1214 to a list 1210 of child nodes.

Using this container definition node, method generateContents 1408 then determines 1410 whether the container definition node is a leaf node. Since container definition node Tech/Prof 1200 is not a leaf node, (i.e. it has a pointer 1214 to a list 1210 of child nodes), method generateContents 1408 creates the children of the selected derived container 1402 (i.e. Tech/Prof derived container 1200).

Figure 17:
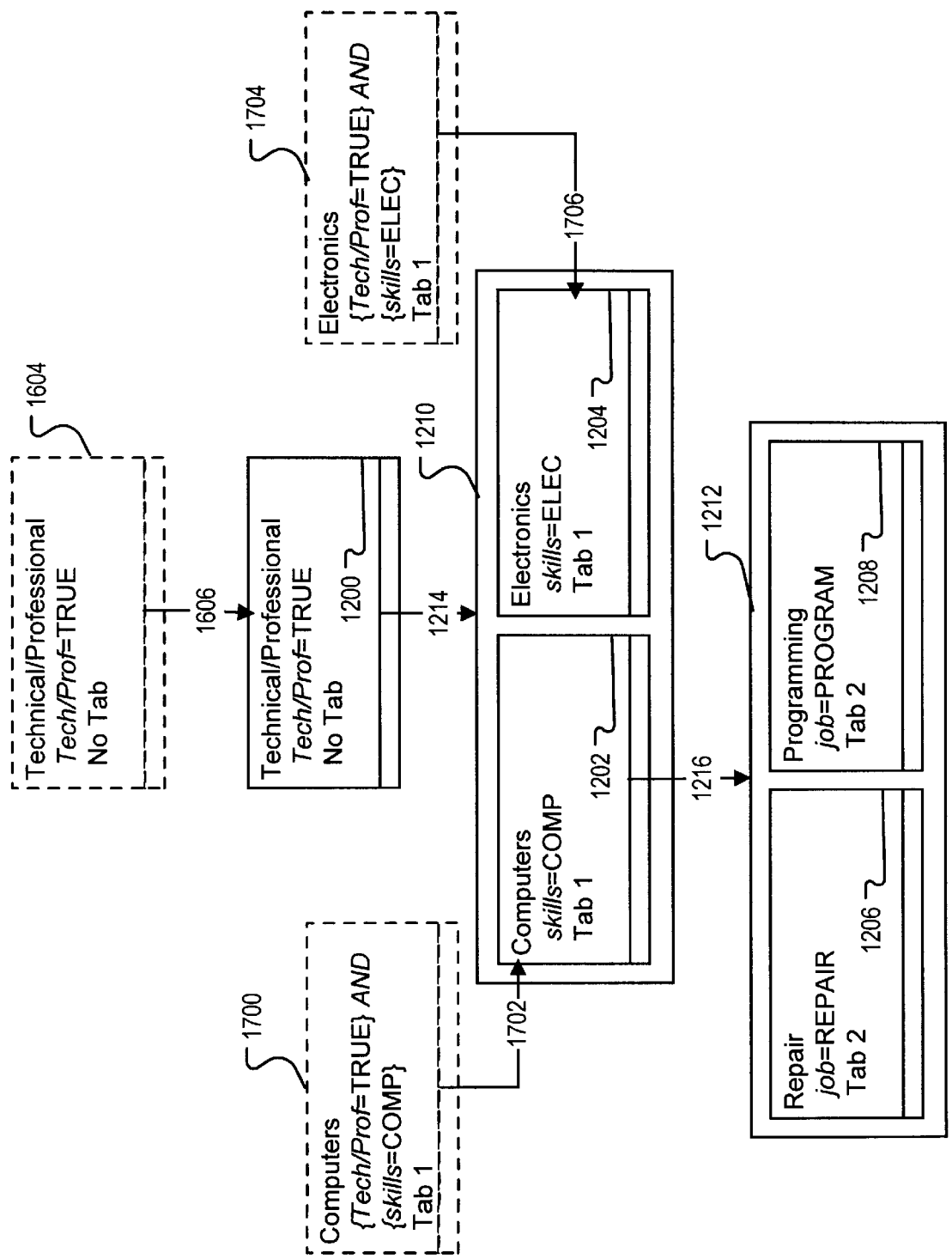
FIG. 17 illustrates derived containers and their corresponding container definition nodes for the information hierarchy of FIG. 12.

To create child derived containers, method generateContents 1408 looks to the list 1210 of child nodes pointed to 1214 by the selected derived container's 1604 corresponding container definition node 1248. As illustrated in FIG. 17, child container definition nodes here include container definition node Computers 1202 and container definition node Electronics 1204. Method generateContents then creates child derived containers for each child container definition node to generate the Computers child derived container 1700 and the Electronics child derived container 1704. The label of the Computers child derived container 1700 and the label of the Electronics child derived container 1704 are displayed in the appropriate format indicated by the display information attribute. In this example, the display information attribute indicates that the labels are to be tabbed once to convey a second level in the hierarchy of FIGS. 8A and 8B. The combined selection criteria of the Computers child derived container 1700 is set by using the Boolean operator AND on the child container definition node's 1202 selection criteria {skills=COMP} and the parent derived container's 1604 combined selection criteria {Tech/Prof=TRUE}. The combined selection criteria for the child derived container Computers 1700 then becomes {{Tech/Prof=TRUE} AND {skills=COMP}}. The pointer 1702 for the Computers child derived container is then set to point back to its corresponding child container definition node 1202. The combined selection criteria of the Electronics child derived container 1704 is set by using the Boolean operator AND on the child container definition node's 1204 selection criteria {skills=ELEC} and the parent derived container's 1604 combined selection criteria {Tech/Prof=TRUE}. The combined selection criteria for the child derived container Electronics 1704 then becomes {{Tech/Prof=TRUE} AND {skills=ELEC}}. Since the Electronics child derived container has no list of child nodes, its pointer is not set.

A user can further traverse the hierarchy by selecting 1400, for example, derived container Electronics 1704 (by its label 836 in FIG. 8B). Method Generate 1404 uses the selected derived container (i.e. the Electronics derived container 1704) pointer 1706 to obtain the selected derived container's corresponding container definition node 1204. Using this container definition node 1204, generateContents 1408 then determines 1410 whether the container definition node is a leaf node. Since the Electronics container definition node 1204 is a leaf node, (i.e. it does not comprise a pointer to a list of child nodes), method fillInLeafNode 1416 is invoked to perform a query 1418 based on the combined selection criteria for the selected derived container to extract records for display. As determined previously, the combined selection criteria for the selected derived container Electronics 1704 is {{Tech/Prof=TRUE} AND {skills=ELEC}}. Method fillInLeafNode 1416 then displays extracted records 1420 that result from the query. Here, only JobNo 1011 is an eligible record that will be displayed, because this is the only record where the combined selection criteria {{Tech/Prof=TRUE} AND {skills=ELEC}} are satisfied.

The result of an information model is both an easy way to organize and access an information repository. This invention was developed for use in Hewlett-Packard's® (Network Node Manager to present alternate organizations of a database comprising devices. While the preferred embodiment of creating and using an information model discussed herein has been directed to databases, it should be emphasized that it is within the scope of this invention that an information model is created and used to organize any kind of information repository. For example, an information model could be created and used to create a hierarchical and logical organization of all the subroutines used in a computer program. This type of information could, for instance, be stored in multiple program files in a single library such that a hierarchy can be created and/or updated by reading the program files in the particular library. Moreover, each file could be created with certain attributes that correspond to container definition node attributes related to creating a hierarchy. Traversing the hierarchy could reveal subroutines used within the selected subroutine, and selecting a subroutine that is a leaf node could reveal all variables used in the subroutine, for instance. Although the creation and use of an information model described herein has been directed to information repositories capable of interaction with computer-based information repositories, an information model is also intended to be used with manually maintained information repositories such as index card files.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Apparatus for accessing an information repository, comprising:
   a. a number of computer readable media; and
   b. computer readable program code stored on said number of computer readable media, said computer readable program code comprising code for organizing information stored in said information repository into a hierarchy, said hierarchy comprising a hierarchy of a number of derived containers, wherein:
      i. said number of derived containers is generated in conformance with an information model comprising a hierarchy of container definition nodes, and each of said number of derived containers corresponds to a different one of said container definition nodes;
      ii. each of said number of derived containers represents a category of information in said information repository; and
      iii. each of said number of derived containers comprises contents.

2. Apparatus as in claim 1, wherein said contents of some derived containers comprise child derived containers, and said contents of other derived containers comprise information extracted from said information repository.

3. Apparatus as in claim 1, wherein said contents of some derived containers comprise both child derived containers and information extracted from said information repository.

4. Apparatus as in claim 1, wherein each of said number of derived containers generated in conformance with the information model inherits at least one attribute from its corresponding container definition node, said at least one attribute comprising a selection criteria attribute that is used to determine the category of information stored in said information repository to which a given one of said number of derived containers corresponds.

5. Apparatus as in claim 1, wherein each of said number of derived containers comprises a combined selection criteria attribute to determine contents, said combined selection criteria being generated in conformance with:

a. a selection criteria attribute of a given derived container's corresponding container definition node; and
b. selection criteria attributes of container definition nodes which are ancestors of said given derived container's corresponding container definition node.

6. Apparatus as in claim 1, wherein some of said number of derived containers comprise a reference to a corresponding container definition node to determine said contents, said contents comprising at least one child derived container that is determined by a corresponding container definition node.

7. Apparatus as in claim 1, wherein said computer readable program code further comprises code for displaying given ones of said number of derived containers to a computer monitor as a user traverses said hierarchy of a number of derived containers.

8. Apparatus for accessing an information repository, comprising:
   a. a number of computer readable media; and
   b. computer readable program code stored on said number of computer readable media, said computer readable program code comprising:
      i. code for creating a hierarchy of derived containers, wherein a given derived container corresponds to:
         (1) a container definition node of an information model, said information model comprising a hierarchy of container definition nodes; and
         (2) a category of information stored in said information repository;
      ii. code for displaying given ones of said derived containers to a computer user; and
      iii. code for determining if a given one of said displayed derived containers has been selected by a computer user, and upon selection of said given one of said displayed derived containers, displaying contents of said given one of said displayed derived containers.

9. Apparatus as in claim 8, wherein the contents of some derived containers comprise child derived containers, and the contents of other derived containers comprise information extracted from said information repository.

10. Apparatus as in claim 8, wherein the contents of some derived containers comprise both child derived containers and information extracted from said information repository.

11. Apparatus as in claim 8, wherein:
    a. said code for creating a hierarchy of derived containers automatically creates a first-level derived container corresponding to a first-level container definition node upon execution of said computer readable program code; and
    b. said code for creating a hierarchy of derived containers creates additional derived containers corresponding to additional container definition nodes upon a user's selection of a derived container which is a parent to said additional derived containers.

12. Apparatus as in claim 8, wherein:
    a. said code for creating a hierarchy of derived containers automatically creates each of said derived containers upon execution of said computer readable program code; and
    b. said code automatically and periodically updates the contents of each of said derived containers.

13. Apparatus as in claim 8, wherein:
    a. various ones of the container definition nodes forming said information model comprise pointers which establish a hierarchical relationship between said container definition nodes of said information model; and
    b. said code for creating a hierarchy of derived containers determines the hierarchical relationship of said derived containers by referring to said information model.

14. Apparatus as in claim 13, wherein each of said derived containers comprises a pointer to its corresponding container definition node, and each of said derived containers inherits attributes from its corresponding container definition node.

15. Apparatus as in claim 8, wherein each of said derived containers inherits at least one attribute from its corresponding container definition node, said at least one attribute comprising a selection criteria attribute which determines the category of information stored in said information repository to which a derived container corresponds.

16. Apparatus as in claim 15, wherein each of said derived containers further inherits the selection criteria attributes from each container definition node which is an ancestor of its corresponding container definition node.

17. Apparatus for accessing an information repository, comprising:
   a. a number of computer readable media; and
   b. computer readable program code stored on said number of computer readable media, said computer readable program code comprising code for creating a hierarchy of derived containers, wherein a given derived container corresponds to:
      i. a container definition node of an information model, said information model comprising a hierarchy of container definition nodes; and
      ii. a category of information stored in said information repository; wherein:
         (1) said hierarchy of container definition nodes comprises at least a first-level container definition node, a plurality of lower level container definition nodes, and a plurality of leaf nodes;
         (2) various of said container definition nodes comprise pointers to other container definition nodes to thereby establish said hierarchy of container definition nodes; and
         (3) each of said container definition nodes comprises a selection criteria attribute.

18. A computer based method of accessing an information repository, comprising:
   a. said computer creating a hierarchy of derived containers, wherein a given derived container corresponds to:
      i. a container definition node of an information model, said information model comprising a hierarchy of container definition nodes; and
      ii. a category of information stored in said information repository;
   b. said computer displaying given ones of said derived containers to a computer user; and
   c. said computer determining if a given one of said displayed derived containers has been selected by a computer user, and upon selection of said given one of said displayed derived containers, displaying contents of said given one of said displayed derived containers.

19. A method as in claim 18, wherein the contents of some derived containers comprise child derived containers, and the contents of other derived containers comprise information extracted from said information repository.

20. A method as in claim 18, wherein the contents of some derived containers comprise both child derived containers and information extracted from said information repository.

* * * * *